United States Patent
Tripathi et al.

(10) Patent No.: US 7,965,714 B2
(45) Date of Patent: Jun. 21, 2011

(54) METHOD AND SYSTEM FOR OFFLOADING NETWORK PROCESSING

(75) Inventors: Sunay Tripathi, San Jose, CA (US); Nicolas G. Droux, Rio Rancho, NM (US)

(73) Assignee: Oracle America, Inc., Redwood City, CA (US)

( * ) Notice: Subject to any disclaimer, the term of this patent is extended or adjusted under 35 U.S.C. 154(b) by 283 days.

(21) Appl. No.: 12/040,165

(22) Filed: Feb. 29, 2008

(65) Prior Publication Data

US 2009/0219936 A1    Sep. 3, 2009

(51) Int. Cl.
H04L 12/28 (2006.01)
(52) U.S. Cl. ........ 370/392; 370/230; 370/235; 370/396; 718/1
(58) Field of Classification Search .................. 370/392, 370/230, 235, 396; 718/1
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A | 12/2000 | Alexander et al. | |
| 6,269,401 B1 | 7/2001 | Fletcher et al. | |
| 6,477,643 B1 | 11/2002 | Vorbach et al. | |
| 6,594,775 B1 | 7/2003 | Fair | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,771,595 B1 | 8/2004 | Gilbert et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 6,985,937 B1 | 1/2006 | Keshav et al. | |
| 7,046,665 B1 | 5/2006 | Walrand et al. | |
| 7,111,303 B2 | 9/2006 | Macchiano et al. | |

(Continued)

FOREIGN PATENT DOCUMENTS

WO    2005057318 A2    6/2005

(Continued)

OTHER PUBLICATIONS

Dovrolis et al, "HIP: Hybrid Interrupt-Polling for the Network Interface", ACM SIGOPS Operating Systems Review, vol. 35, Iss. 4, Oct. 2001, pp. 50-60.*

(Continued)

*Primary Examiner* — Ricky Ngo
*Assistant Examiner* — Luat Phung
(74) *Attorney, Agent, or Firm* — Osha • Liang LLP

(57) ABSTRACT

The invention relates to a method for processing a packet. The method includes receiving the packet by a physical network interface, determining a target virtual network interface card (VNIC) using the destination address and a virtual switching table (VST), transferring the packet to a receive ring (RR) associated with the target VNIC, wherein the RR is located on the NEM, determining, by the target VNIC, that the packet is in the RR, determining, by the target VNIC, that the packet is to be processed using an offload engine, transferring the packet to offload memory located on an offload computer, wherein the offload computer is operatively connected to the NEM via the chassis interconnect and wherein the offload engine is executing on the offload computer, processing the packet by the offload engine to obtain a processed packet, and transferring the processed packet to a target computer memory using the chassis interconnect.

11 Claims, 10 Drawing Sheets

U.S. PATENT DOCUMENTS

| | | |
|---|---|---|
| 7,146,431 B2 | 12/2006 | Hipp et al. |
| 7,177,311 B1 | 2/2007 | Hussain et al. |
| 7,200,704 B2 | 4/2007 | Njoku et al. |
| 7,260,102 B2 | 8/2007 | Mehrvar et al. |
| 7,313,142 B2 | 12/2007 | Matsuo et al. |
| 7,450,498 B2 | 11/2008 | Golia et al. |
| 7,502,884 B1 | 3/2009 | Shah et al. |
| 7,561,531 B2 | 7/2009 | Lewites et al. |
| 7,620,955 B1 | 11/2009 | Nelson |
| 7,633,955 B1* | 12/2009 | Saraiya et al. ............ 370/401 |
| 7,688,838 B1 | 3/2010 | Aloni et al. |
| 7,694,298 B2 | 4/2010 | Goud et al. |
| 7,730,486 B2 | 6/2010 | Herington |
| 2002/0052972 A1 | 5/2002 | Yim |
| 2002/0080721 A1 | 6/2002 | Tobagi et al. |
| 2003/0037154 A1 | 2/2003 | Poggio et al. |
| 2003/0120772 A1 | 6/2003 | Husain et al. |
| 2004/0015966 A1 | 1/2004 | MacChiano et al. |
| 2004/0170127 A1 | 9/2004 | Tanaka |
| 2004/0199808 A1* | 10/2004 | Freimuth et al. ............ 714/4 |
| 2004/0202182 A1 | 10/2004 | Lund et al. |
| 2004/0210623 A1 | 10/2004 | Hydrie et al. |
| 2004/0267866 A1 | 12/2004 | Carollo et al. |
| 2005/0111455 A1 | 5/2005 | Nozue et al. |
| 2005/0135243 A1 | 6/2005 | Lee et al. |
| 2005/0138620 A1 | 6/2005 | Lewites |
| 2005/0182853 A1 | 8/2005 | Lewites et al. |
| 2005/0251802 A1 | 11/2005 | Bozek et al. |
| 2006/0041667 A1 | 2/2006 | Ahn et al. |
| 2006/0045089 A1* | 3/2006 | Bacher et al. ............ 370/392 |
| 2006/0070066 A1 | 3/2006 | Grobman |
| 2006/0092928 A1 | 5/2006 | Pike et al. |
| 2006/0174324 A1 | 8/2006 | Zur et al. |
| 2006/0206300 A1 | 9/2006 | Garg et al. |
| 2006/0206602 A1 | 9/2006 | Hunter et al. |
| 2006/0233168 A1 | 10/2006 | Lewites et al. |
| 2006/0236063 A1 | 10/2006 | Hausauer et al. |
| 2006/0253619 A1 | 11/2006 | Torudbakken et al. |
| 2007/0047536 A1 | 3/2007 | Scherer et al. |
| 2007/0078988 A1 | 4/2007 | Miloushev et al. |
| 2007/0083723 A1 | 4/2007 | Dey et al. |
| 2007/0101323 A1 | 5/2007 | Foley et al. |
| 2007/0244937 A1 | 10/2007 | Flynn et al. |
| 2007/0244972 A1 | 10/2007 | Fan |
| 2008/0002683 A1 | 1/2008 | Droux et al. |
| 2008/0005748 A1 | 1/2008 | Mathew et al. |
| 2008/0019365 A1 | 1/2008 | Tripathi et al. |
| 2008/0022016 A1 | 1/2008 | Tripathi et al. |
| 2008/0043765 A1 | 2/2008 | Belgaied et al. |
| 2008/0144635 A1* | 6/2008 | Carollo et al. ............ 370/397 |
| 2008/0171550 A1 | 7/2008 | Zhao |
| 2008/0192648 A1 | 8/2008 | Galles |
| 2008/0225875 A1 | 9/2008 | Wray et al. |
| 2008/0239945 A1 | 10/2008 | Gregg |
| 2008/0253379 A1 | 10/2008 | Sasagawa |
| 2008/0270599 A1 | 10/2008 | Tamir et al. |
| 2009/0006593 A1 | 1/2009 | Cortes |
| 2009/0125752 A1 | 5/2009 | Chan et al. |
| 2010/0046531 A1 | 2/2010 | Louati et al. |

FOREIGN PATENT DOCUMENTS

| | | |
|---|---|---|
| WO | 2008093174 A1 | 8/2008 |

OTHER PUBLICATIONS

International Search Report dated Aug. 19, 2009 (3 pages).
Tripathi, S.; "Solaris Networking—The Magic Revealed (Part I)"; Sunay Tripathi's Solaris Networking Weblog; Nov. 14, 2005, pp. 1-22 (22 pages).
Tripathi, S.; "CrossBow: Solaris Network Virtualization and Resource Control"; Crossbow Architectual Document, Nov. 21, 2006; 19 pages.
Nordmark, E. et al. ; "IP Instances Interface Document"; PSARC 20061366, Dec. 28, 2006; 17 pages.
Nordmark, E.; "IP Instances Design Document"; PSARC 2006/366, Dec. 21, 2006; 38 pages.
Tripathi, S.; "CrossBow: Solaris Network Virtualization & Resource Control"; CrossBow Overview Document, Aug. 23, 2006; 12 pges.
Nordmark, E.; "IP Instances—Network Isolation Meets Zones"; presented at the SVOSUG meeting, Oct. 26, 2006; 28 pages.
Tripathi, S.; "CrossBow: Network Virtualization and Resource Control"; presented at the SVOSUG meeting, Aug. 24, 2006; 28 pages.
Tripathi, S.; "Crossbow: ReCap"; presented at an internal Sun Labs Open House presentation on Jun. 1, 2006, made public Aug. 2006; 23 pages.
Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).
International Preliminary Report on Patentability issued in PCT/US2009/035405, Dated Sep. 10, 2010. (9 pages).
Goldenberg, D. et al.; "Zero Copy Sockets Direct Protocol over InfiniBand - Preliminary Implementation and Performance Analysis"; Proceedings of the 13th Symposium on High Performance Interconnects; Piscataway, NJ; Aug. 17-19, 2005; pp. 128-137 (10 pages)
"I/O Virtualization Using Mellanox InfiniBand and Channel I/O Virtualization (Ciov) Technology"; XP-002541674;.Jan. 1, 2007; Retrieved from the Internet: <http://www.mellanox.com/pdf/whitepapers/WP_Virtualize_with_IB.pdf>; pp. 1-16 (16 pages).
"InfiniBand Software Stack"; XP-002541744; Jan. 1, 2006; Retrieved from the Internet: <http://download.microsoft.com/download/c/3/1/c318044c-95e8-4df9-a6af-81cdcb3c53c5/Mellanox%20Technologies°/020-%20Infiniband%20Softwar0/020Stack%20-%20WinIB%20-%20external.Pdf>; pp. 1-2 (2 pages).
Wheeler, B.; "10 Gigabit Ethernet in Servers: Benefits and Challenges"; XP-002541745; Jan. 1, 2005; Retrieved from the Internet: <http://www.hp.com/productsl/serverconnectivity/adapters/ethernet/10gbe/infolibrary/ /10GbE_White_Paper.pdf> (8 pages).
"Windows Platform Design Notes: Winsock Direct and Protocol Offload on SANs"; XP-002541746; Mar. 3, 2001;.Retrieved from the Internet: <http://download.microsoft.com/ download/1/6/1/161ba512-40e2-4cc9-843a-923143f3456c/WinsockDirect-ProtocolOffload.doc> (8 pages).
International Search Report from PCT/US2009/048594 dated Sep. 7, 2009 (4 pages).
Written Opinion from PCT/US2009/048594 dated Sep. 07, 2009 (1 page).
Popuri, S., OpenSolaris Virtualization Technologies, Feb. 23, 2007, Retrieved from the Internet, >hub.opensolaris.org/bin/view/Community+Group+advocacy/techdays%2Darchive%2D06%2D07>, 2 pages.
Kumar, R., ASI and PCI Express: C omplementary Solutions, Dec. 1, 2004, RTC Magazine, Retrieved from the Internet >rtcmagazine.com/articles/view/100274>, (5 pages).
Martinez, R., Alfaro, F.J., and Sanchez, J.L., Providing Quality of Service Over Advanced Switching, Jan. 1, 2006, IEEE, Retrieved from the Internet, <ieeexploreieee.org/xpls/abs_all.jsp?arnumber=1655667Mag=1>, 10 pages.
Apani, Brave New World, Feb. 1, 2007, iSmile, Retrieved from the Internet, <isimile.comlPDFsl Apan_Segmentation_WP.pdf>, 8 pages.
Trapeze, Trapeze Overview, Jan. 1, 1998, USENIX, Retrieved from the Internet, <usenix.org/publications/library/ proceedings/usenix98/full_papers/anderson/anderson_html/node4.html>, 2 pages.
Office Action in United States Patent and Trademark Office for U.S. Appl. No. 11/953,829, Mailed Aug. 4, 2010 (30 pages).
Office Action in United States Patent and Trademark Office for U.S. Appl. No. 11/953,837, Mailed Jun. 11, 2010 (27 pages).
Office Action in United States Patent and Trademark Office for U.S. Appl. No. 11/953,839, Mailed Aug. 19, 2010 (30 pages).
Office Action in United States Patent and Trademark Office for U.S. Appl. No. 12/053,676, Mailed Dec. 9, 2009 (41 pages).
Final Office Action in United States Patent and Trademark Office for U.S. Appl. No. 12/040,101, Mailed Dec. 13, 2010 (25 pages).
Office Action in United States Patent and Trademark Office for U.S. Appl. No. 12/040,101, Mailed May 6, 2010 (39 pages).
Office Action in United States Patent and Trademark Office for U.S. Appl. No. 11/953,842, Mailed Apr. 30, 2010 (39 pages).

Final Office Action in United States Patent and Trademark Office for U.S. Appl. No. 11/953,842, Mailed Oct. 15, 2010 (32 pages).
Office Action in United States Patent and Trademark Office for U.S. Appl. No. 12/040,105, Mailed Nov. 20, 2009 (93 pages).
Final Office Action in United States Patent and Trademark Office for U.S. Appl. No. 12/040,105, Mailed May 26, 2010 (26 pages).
Notice of Allowance in United States Patent and Trademark Office for U.S. Appl. No. 12/040,105, Mailed Oct. 5, 2010 (27 pages).
Office Action in United States Patent and Trademark Office for U.S. Appl. No. 11/953,843, Mailed May 3, 2010 (169 pages).
Final Office Action in United States Patent and Trademark Office for U.S. Appl. No. 11/953,843, Mailed Oct. 15, 2010 (33 pages).
Office Action in United States Patent and Trademark Office for U.S. Appl. No. 12/053,666, Mailed Dec. 10, 2009 (36 pages).
Final Office Action in United States Patent and Trademark Office for U.S. Appl. No. 12/053,666, Mailed Jun. 11, 2010 (27 pages).
Notice of Allowance in United States Patent and Trademark Office for U.S. Appl. No. 12/053,666, Mailed Oct. 7, 2010 (15 pages).
Notice of Allowance in United States Patent and Trademark Office for U.S. Appl. No. 12/053,676, Mailed Jul. 15, 2010 (20 pages).
Office Action in United States Patent and Trademark Office for U.S. Appl. No. 11/953,843, Mailed May 3, 2010 (169 pages).

* cited by examiner

METHOD AND SYSTEM FOR OFFLOADING NETWORK PROCESSING

CROSS-REFERENCE TO RELATED APPLICATIONS

The present application contains subject matter that may be related to the subject matter in the following U.S. applications filed on Dec. 10, 2007, and assigned to the assignee of the present application: "Method and System for Creating a Virtual Network Path" with U.S. application Ser. No. 11/953,829; "Method and System for Controlling Network Traffic In a Blade" with U.S. application Ser. No. 11/953,832; "Method and System for Reconfiguring a Virtual Network Path" with U.S. Application Ser. No. 11/953,837; "Method and System for Enforcing Resource Constraints For Virtual Machines Across Migration" with U.S. application Ser. No. 11/953,839; and "Method and System for Monitoring Virtual Wires" with U.S. application Ser. No. 11/953,842.

The present application contains subject matter that may be related to the subject matter in the following U.S. applications filed on Feb. 29, 2008, and assigned to the assignee of the present application: "Method and System for Transferring Packets to a Guest Operating System" with U.S. application Ser. No. 12/040,101 and "Method and System for Media-Based Data Transfer" with U.S. Application Ser. No. 12/040,105.

BACKGROUND

Conventionally, in the computer-related arts, a network is an arrangement of physical computer systems configured to communicate with each other. In some cases, the physical computer systems include virtual machines, which may also be configured to interact with the network (i.e., communicate with other physical computers and/or virtual machines in the network). Many different types of networks exist, and a network may be classified based on various aspects of the network, such as scale, connection method, functional relationship of computer systems in the network, and/or network topology.

Regarding connection methods, a network may be broadly categorized as wired (using a tangible connection medium such as Ethernet cables) or wireless (using an intangible connection medium such as radio waves). Different connection methods may also be combined in a single network. For example, a wired network may be extended to allow devices to connect to the network wirelessly. However, core network components such as routers, switches, and servers are generally connected using physical wires. Ethernet is defined within the Institute of Electrical and Electronics Engineers (IEEE) 802.3 standards, which are supervised by the IEEE 802.3 Working Group.

To create a wired network, computer systems must be physically connected to each other. That is, the ends of physical wires (for example, Ethernet cables) must be physically connected to network interface cards in the computer systems forming the network. To reconfigure the network (for example, to replace a server or change the network topology), one or more of the physical wires must be disconnected from a computer system and connected to a different computer system.

SUMMARY

In general, in one aspect, the invention relates to a method for processing a packet. The method includes receiving the packet by a physical network interface, wherein the packet comprises a destination address, determining a target virtual network interface card (VNIC) using the destination address and a virtual switching table (VST), wherein the VST is located on a network express manager (NEM) and the target VNIC is located on a target computer operatively connected to the NEM via a chassis interconnect, transferring the packet to a receive ring (RR) associated with the target VNIC, wherein the RR is located on the NEM, determining, by the target VNIC, that the packet is in the RR, determining, by the target VNIC, that the packet is to be processed using an offload engine, transferring the packet to offload memory located on an offload computer, wherein the offload computer is operatively connected to the NEM via the chassis interconnect and wherein the offload engine is executing on the offload computer, processing the packet by the offload engine to obtain a processed packet, and transferring the processed packet to a target computer memory using the chassis interconnect.

In general, in one aspect, the invention relates to a method for sending a packet. The method includes sending data from an application to a network stack on a source computer, wherein the application specifies a target destination for the data, determining by the network stack that the data are to be processed by an offload engine, transferring the data from the source computer to offload memory located on an offload computer executing the offload engine, wherein the source computer and the offload computer are communicatively coupled to each other via a chassis interconnect, processing the data by the offload engine to obtain processed data, building the packet using the processed data, wherein the packet specifies the target destination, transferring the packet to a transmit ring (TR) associated with the network stack, wherein the TR is located on a network express manager (NEM) operatively connected to the chassis interconnect, and sending the packet to the target destination using a physical interface communicatively coupled to the NEM.

In general, in one aspect, the invention relates to a system. The system includes a computer comprising memory, a virtual network interface (VNIC), a network stack associated with the VNIC, and a packet destination associated with the network stack, an offload computer comprising an offload engine and offload memory, a chassis interconnect configured to communicatively couple the computer and the offload computer, a network express manager (NEM) communicatively coupled to the chassis interconnect and comprising a physical network interface, a virtual switching table (VST), and a receive ring (RR) associated with the VNIC. The NEM is configured to: receive a packet, using the physical network interface, wherein the packet comprises a destination address, transfer the packet to the RR using the VST and the destination address. The computer is configured to: determine that the packet is in the RR, determine that the packet is to be processed using the offload engine, and initiate the transfer of the packet to the offload memory. The NEM is further configured to: transfer the packet from the RR to the offload memory. The offload engine is configured to: process to obtain a processed packet, and initiate the transfer of the processed packet to the computer. The computer is further configured to: receive the processed packet from the offload engine.

Other aspects of the invention will be apparent from the following description and the appended claims.

DETAILED DESCRIPTION

Figure 1:
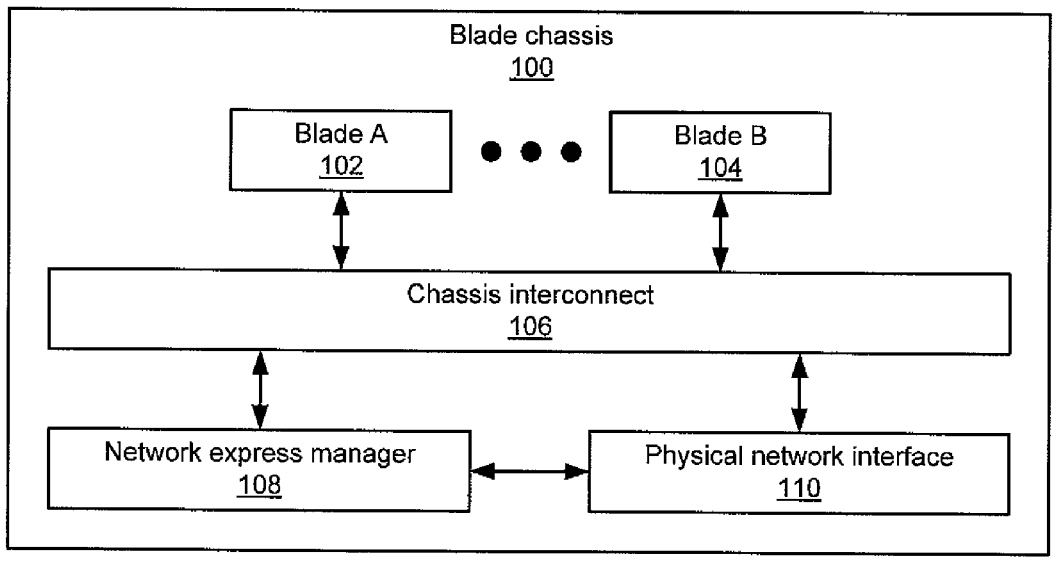
FIG. 1 shows a diagram of a blade chassis in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for offloading network processing between blades in a chassis. More specifically, embodiments of the invention relate to a method and system for offloading network processing to a software offload engine executing on a blade in a chassis.

FIG. 1 shows a diagram of a blade chassis (100) in accordance with one or more embodiments of the invention. The blade chassis (100) includes multiple blades (e.g., blade A (102), blade B (104)) communicatively coupled with a chassis interconnect (106). For example, the blade chassis (100) may be a Sun Blade 6048 Chassis by Sun Microsystems Inc., an IBM BladeCenter® chassis, an HP BladeSystem enclosure by Hewlett Packard Inc., or any other type of blade chassis. The blades may be of any type(s) compatible with the blade chassis (100). BladeCenter® is a registered trademark of International Business Machines, Inc. (IBM), headquartered in Armonk, N.Y.

In one or more embodiments of the invention, the blades are configured to communicate with each other via the chassis interconnect (106). Thus, the blade chassis (100) allows for communication between the blades without requiring traditional network wires (such as Ethernet cables) between the blades. For example, depending on the type of blade chassis (100), the chassis interconnect (106) may be a Peripheral Component Interface Express (PCI-E) backplane, and the blades may be configured to communicate with each other via PCI-E endpoints. Those skilled in the art will appreciate that other connection technologies may be used to connect the blades to the blade chassis.

Continuing with the discussion of FIG. 1, to communicate with clients outside the blade chassis (100), the blades are configured to share a physical network interface (110). The physical network interface (110) includes one or more network ports (for example, Ethernet ports), and provides an interface between the blade chassis (100) and the network (i.e., interconnected computer systems external to the blade chassis (100)) to which the blade chassis (100) is connected. The blade chassis (100) may be connected to multiple networks, for example using multiple network ports.

In one or more embodiments, the physical network interface (110) is managed by a network express manager (108). Specifically, the network express manager (108) is configured to manage access by the blades to the physical network interface (110). The network express manager (108) may also be configured to manage internal communications between the blades themselves, in a manner discussed in detail below. The network express manager (108) may be any combination of hardware, software, and/or firmware including executable logic for managing network traffic.

Figure 2:
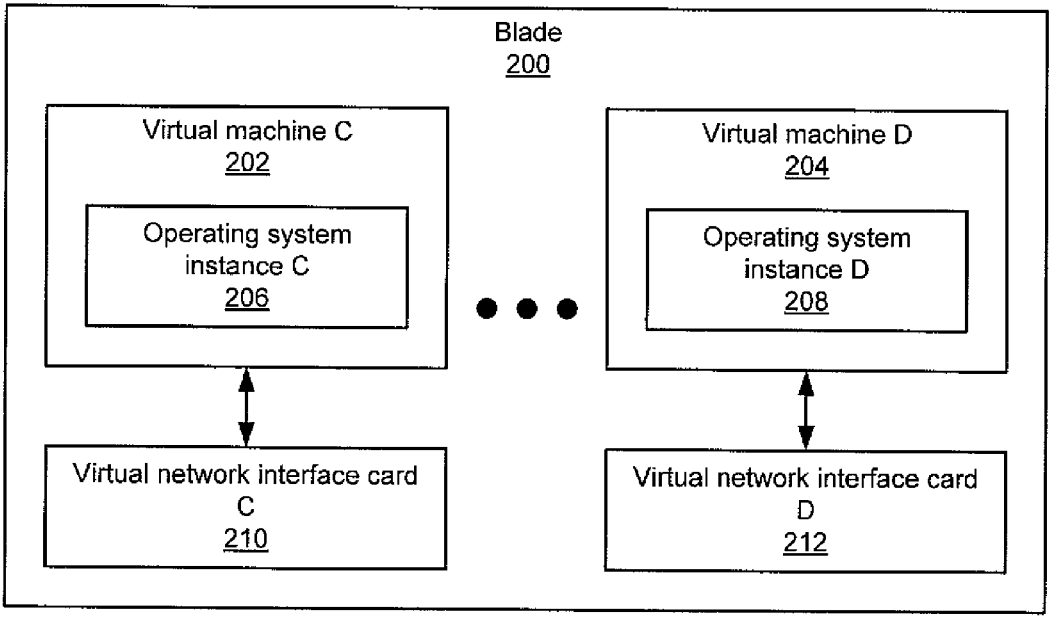
FIG. 2 shows a diagram of a blade in accordance with one or more embodiments of the invention.

FIG. 2 shows a diagram of a blade (200) in accordance with one or more embodiments of the invention. "Blade" is a term of art referring to a computer system located within a blade chassis (for example, the blade chassis (100) of FIG. 1). Blades typically include fewer components than stand-alone computer systems or conventional servers. In one embodiment of the invention, fully featured stand-alone computer systems or conventional servers may also be used instead of or in combination with the blades. Generally, blades in a blade chassis each include one or more processors and associated memory. Blades may also include storage devices (for example, hard drives and/or optical drives) and numerous other elements and functionalities typical of today's computer systems (not shown), such as a keyboard, a mouse, and/or output means such as a monitor. One or more of the aforementioned components may be shared by multiple blades located in the blade chassis. For example, multiple blades may share a single output device.

Continuing with discussion of FIG. 2, the blade (200) includes a host operating system (not shown) configured to execute one or more virtual machines (e.g., virtual machine C (202), virtual machine D (204)). Broadly speaking, the virtual machines are distinct operating environments configured to inherit underlying functionality of the host operating system via an abstraction layer. In one or more embodiments of the invention, each virtual machine includes a separate instance of an operating system (e.g., operating system instance C (206), operating system instance D (208)). For example, the Xen® virtualization project allows for multiple guest operating systems executing in a host operating system. Xen® is a trademark overseen by the Xen Project Advisory Board. In one embodiment of the invention, the host operating system supports virtual execution environments (not shown). An example of virtual execution environment is a Solaris™ Container. In such cases, the Solaris™ Container may execute in the host operating system, which may be a Solaris™ operating system. Solaris™ is a trademark of Sun Microsystems, Inc. In one embodiment of the invention, the host operating system may include both virtual machines and virtual execution environments.

Many different types of virtual machines and virtual execution environment exist. Further, the virtual machines may include many different types of functionality, such as a switch, a router, a firewall, a load balancer, an application server, any other type of network-enabled service, or any combination thereof.

In one or more embodiments of the invention, the virtual machines and virtual execution environments inherit network connectivity from the host operating system via VNICs (e.g., VNIC C (210), VNIC D (212)). To the virtual machines and the virtual execution environments, the VNICs appear as physical NICs. In one or more embodiments of the invention, the use of VNICs allows an arbitrary number of virtual machines or and virtual execution environments to share the blade's (200) networking functionality. Further, in one or more embodiments of the invention, each virtual machine or and virtual execution environment may be associated with an arbitrary number of VNICs, thereby providing increased flexibility in the types of networking functionality available to the virtual machines and/or and virtual execution environments. For example, a virtual machine may use one VNIC for incoming network traffic, and another VNIC for outgoing network traffic. VNICs in accordance with one or more embodiments of the invention are described in detail in commonly owned U.S. patent application Ser. No. 11/489,942, entitled "Multiple Virtual Network Stack Instances using Virtual Network Interface Cards," in the names of Nicolas G. Droux, Erik Nordmark, and Sunay Tripathi, the contents of which are hereby incorporated by reference in their entirety.

VNICs in accordance with one or more embodiments of the invention also are described in detail in commonly owned U.S. patent application Ser. No. 11/480,000, entitled "Method and System for Controlling Virtual Machine Bandwidth" in the names of Sunay Tripathi, Tim P. Marsland, and Nicolas G. Droux the contents of which are hereby incorporated by reference in their entirety.

Figure 3:
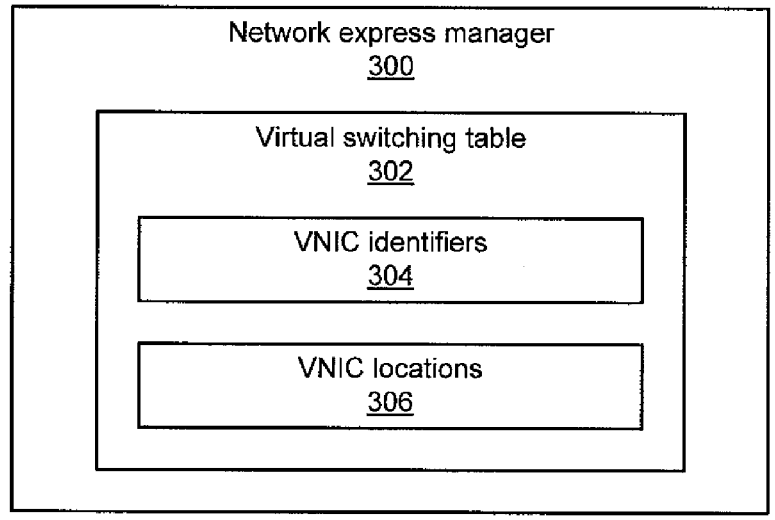
FIG. 3 shows a diagram of a network express manager in accordance with one or more embodiments of the invention.

As discussed above, each blade's networking functionality (and, by extension, networking functionality inherited by the VNICs) includes access to a shared physical network interface and communication with other blades via the chassis interconnect. FIG. 3 shows a diagram of a network express manager (300) in accordance with one or more embodiments of the invention. The network express manager (300) is configured to route network traffic traveling to and from VNICs located in the blades. Specifically, the network express manager (300) includes a virtual switching table (302), which includes a mapping of VNIC identifiers (304) to VNIC locations (306) in the chassis interconnect. In one or more embodiments, the VNIC identifiers (304) are Internet Protocol (IP) addresses, and the VNIC locations (306) are PCI-E endpoints associated with the blades (e.g., if the chassis interconnect is a PCI-E backplane). Alternatively, another switching scheme may be used.

In one or more embodiments, the network express manager (300) is configured to receive network traffic via the physical network interface and route the network traffic to the appropriate location (i.e., where the VNIC is located) using the virtual switching table (302). Further, the network express manager (300) may be configured to route network traffic between different VNICs located in the blade chassis. In one or more embodiments of the invention, using the virtual switching table (302) in this manner facilitates the creation of a virtual network path, which includes virtual wires. Thus, using the virtual switching table (302), virtual machines located in different blades may be interconnected to form an arbitrary virtual network topology, where the VNICs associated with each virtual machine do not need to know the physical locations of other VNICs. Further, if a virtual machine is migrated from one blade to another, the virtual network topology may be preserved by updating the virtual switching table (302) to reflect the corresponding VNIC's new physical location (for example, a different PCI-E endpoint).

In some cases, network traffic from one VNIC may be destined for a VNIC located in the same blade, but associated with a different virtual machine. In one or more embodiments of the invention, a virtual switch may be used to route the network traffic between the VNICs independent of the blade chassis. Virtual switches in accordance with one or more embodiments of the invention are discussed in detail in commonly owned U.S. patent application Ser. No. 11/480,261, entitled "Virtual Switch," in the names of Nicolas G. Droux, Sunay Tripathi, and Erik Nordmark, the contents of which are hereby incorporated by reference in their entirety.

Figure 4:
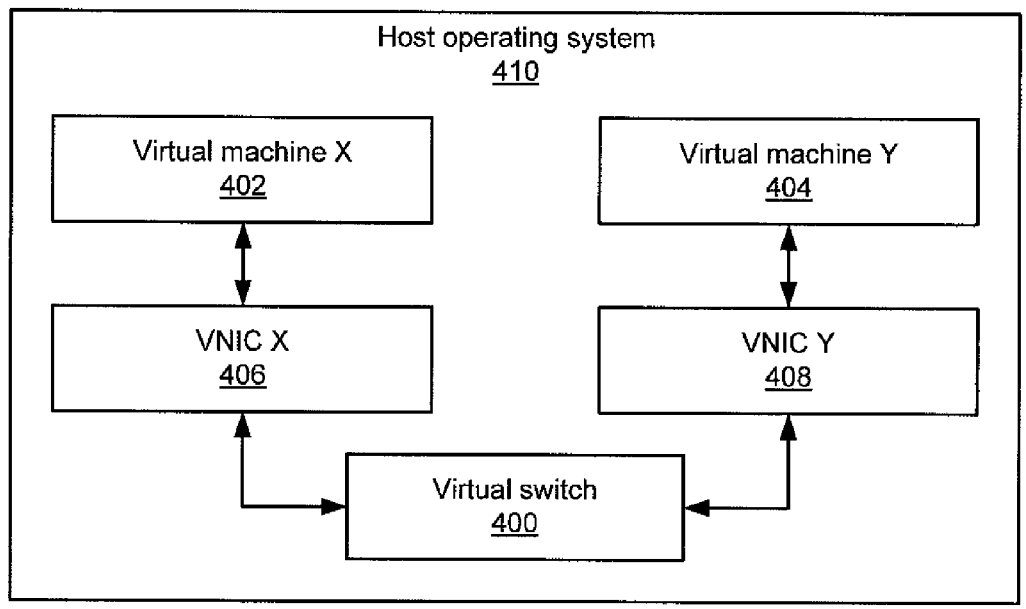
FIG. 4 shows a diagram of a virtual machine in accordance with one or more embodiments of the invention.

For example, FIG. 4 shows a diagram of a virtual switch (400) in accordance with one or more embodiments of the invention. The virtual switch (400) provides connectivity between VNIC X (406) associated with virtual machine X (402) and VNIC Y (408) associated with virtual machine Y (404). In one or more embodiments, the virtual switch (400) is managed by a host operating system (410) within which virtual machine X (402) and virtual machine Y (404) are located. Specifically, the host operating system (410) may be configured to identify network traffic targeted at a VNIC in the same blade, and route the traffic to the VNIC using the virtual switch (400). In one or more embodiments of the invention, the virtual switch (400) may reduce utilization of the blade chassis and the network express manager by avoiding unnecessary round-trip network traffic.

Figure 5:
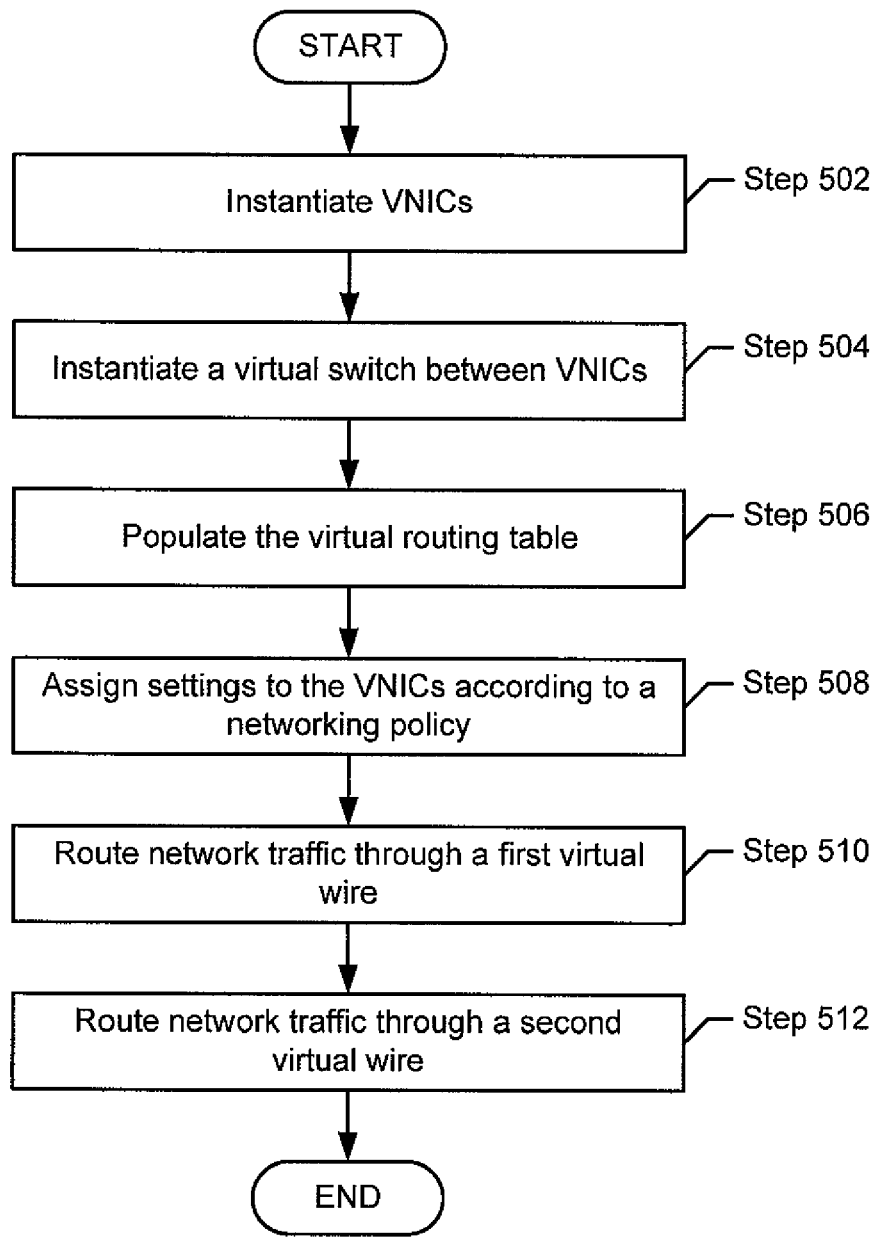
FIG. 5 shows a flowchart of a method for creating a virtual network path in accordance with one or more embodiments of the invention.

FIG. 5 shows a flowchart of a method for creating a virtual network path in accordance with one or more embodiments of the invention. In one or more embodiments of the invention, one or more of the steps shown in FIG. 5 may be omitted, repeated, and/or performed in a different order. Accordingly, embodiments of the invention should not be considered limited to the specific arrangement of steps shown in FIG. 5.

In one or more embodiments of the invention, in Step 502, VNICs are instantiated for multiple virtual machines. The virtual machines are located in blades, as discussed above. Further, the virtual machines may each be associated with one or more VNICs. In one or more embodiments of the invention, instantiating a VNIC involves loading a VNIC object in memory and registering the VNIC object with a host operating system, i.e., an operating system that is hosting the virtual machine associated with the VNIC. Registering the VNIC object establishes an interface between the host operating system's networking functionality and the abstraction layer provided by the VNIC. Thereafter, when the host operating system receives network traffic addressed to the VNIC, the host operating system forwards the network traffic to the VNIC. Instantiation of VNICs in accordance with one or more embodiments of the invention is discussed in detail in U.S. patent application Ser. No. 11/489,942, incorporated by reference above.

As discussed above, a single blade may include multiple virtual machines configured to communicate with each other. In one or more embodiments of the invention, in Step 504, a virtual switch is instantiated to facilitate communication between the virtual machines. As noted above, the virtual switch allows communication between VNICs independent of the chassis interconnect. Instantiation of virtual switches in accordance with one or more embodiments of the invention is discussed in detail in U.S. patent application Ser. No. 11/480, 261, incorporated by reference above.

In one or more embodiments of the invention, in Step 506, a virtual switching table is populated. As noted above, the virtual switching table may be located in a network express manager configured to manage network traffic flowing to and from the virtual machines. Populating the virtual switching table involves associating VNIC identifiers (for example, Internet Protocol and/or Media Access Control (MAC) addresses) with VNIC locations (for example, PCI-E endpoints). In one or more embodiments of the invention, the virtual switching table is populated in response to a user command issued via a control operating system, i.e., an operating system that includes functionality to control the network express manager.

In one or more embodiments of the invention, VNICs include settings for controlling the processing of network packets. In one or more embodiments of the invention, in Step 508, settings are assigned to the VNICs according to a networking policy. Many different types of networking policies may be enforced using settings in the VNICs. For example, a setting may be used to provision a particular portion of a blade's available bandwidth to one or more VNICs. As another example, a setting may be used to restrict use of a VNIC to a particular type of network traffic, such as Voice over IP (VoIP) or Transmission Control Protocol/IP (TCP/IP). Further, settings for multiple VNICs in a virtual network path may be identical. For example, VNICs in a virtual network path may be capped at the same bandwidth limit, thereby allowing for consistent data flow across the virtual network path. In one or more embodiments of the invention, a network express manager is configured to transmit the desired settings to the VNICs.

In one or more embodiments of the invention, once the VNICs are instantiated and the virtual switching table is populated, network traffic may be transmitted from a VNIC in one blade to a VNIC in another blade. The connection between the two VNICs may be thought of as a "virtual wire," because the arrangement obviates the need for traditional network wires such as Ethernet cables. A virtual wire functions similar to a physical wire in the sense that network traffic passing through one virtual wire is isolated from network traffic passing through another virtual wire, even though the network traffic may pass through the same blade (i.e., using the same virtual machine or different virtual machines located in the blade).

Further, a combination of two or more virtual wires may be thought of as a "virtual network path." Specifically, transmitting network traffic over the virtual network path involves switching the network traffic through a first virtual wire (Step 510) and then through a second virtual wire (Step 512). For example, when receiving network traffic from a client via the physical network interface, one virtual wire may be located between the physical network interface and a VNIC, and a second virtual wire may be located between the VNIC and another VNIC.

Figure 6A:
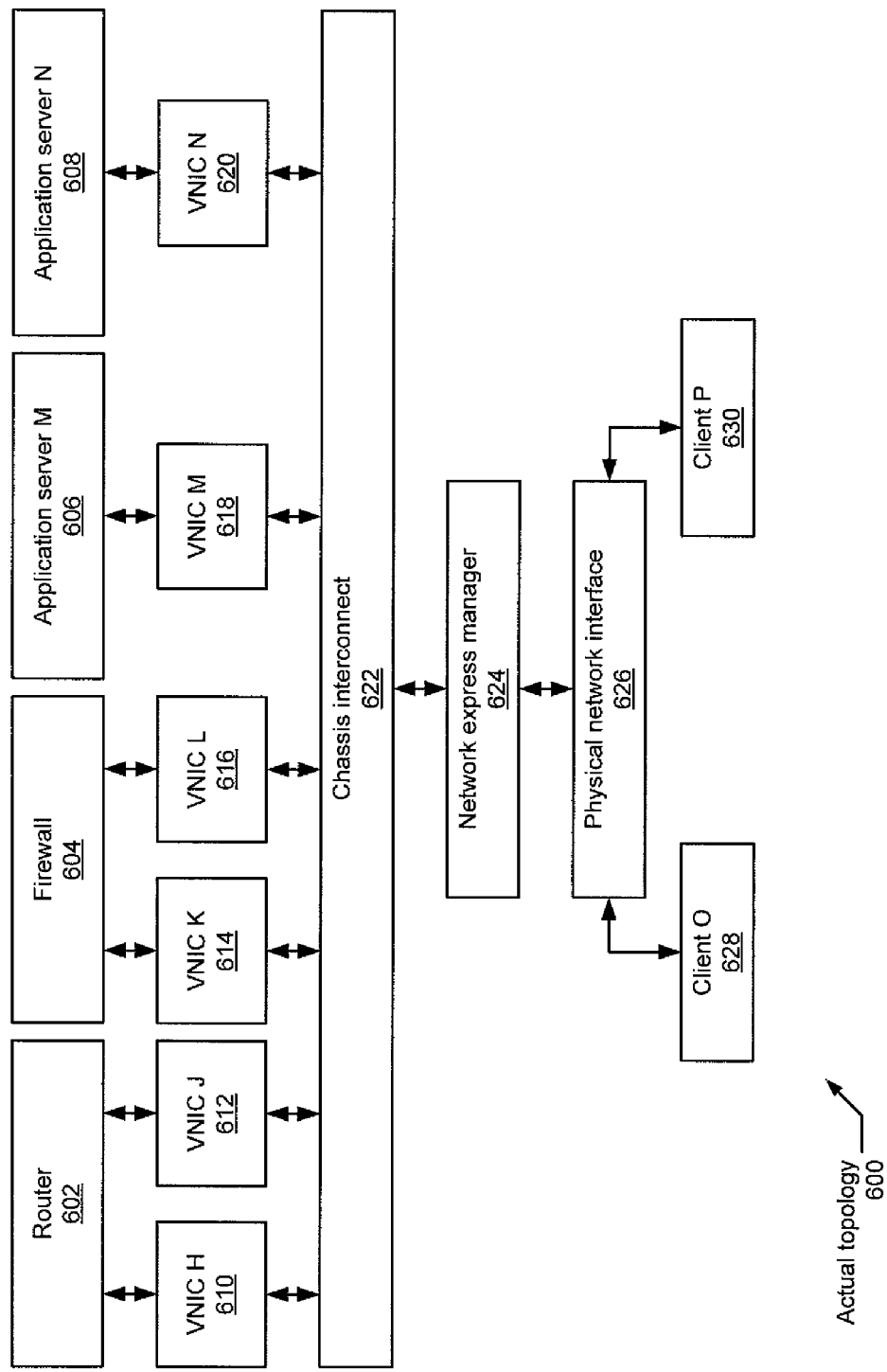
FIGS. 6A-6C show an example of creating virtual network paths in accordance with one or more embodiments of the invention.
Figure 6B:
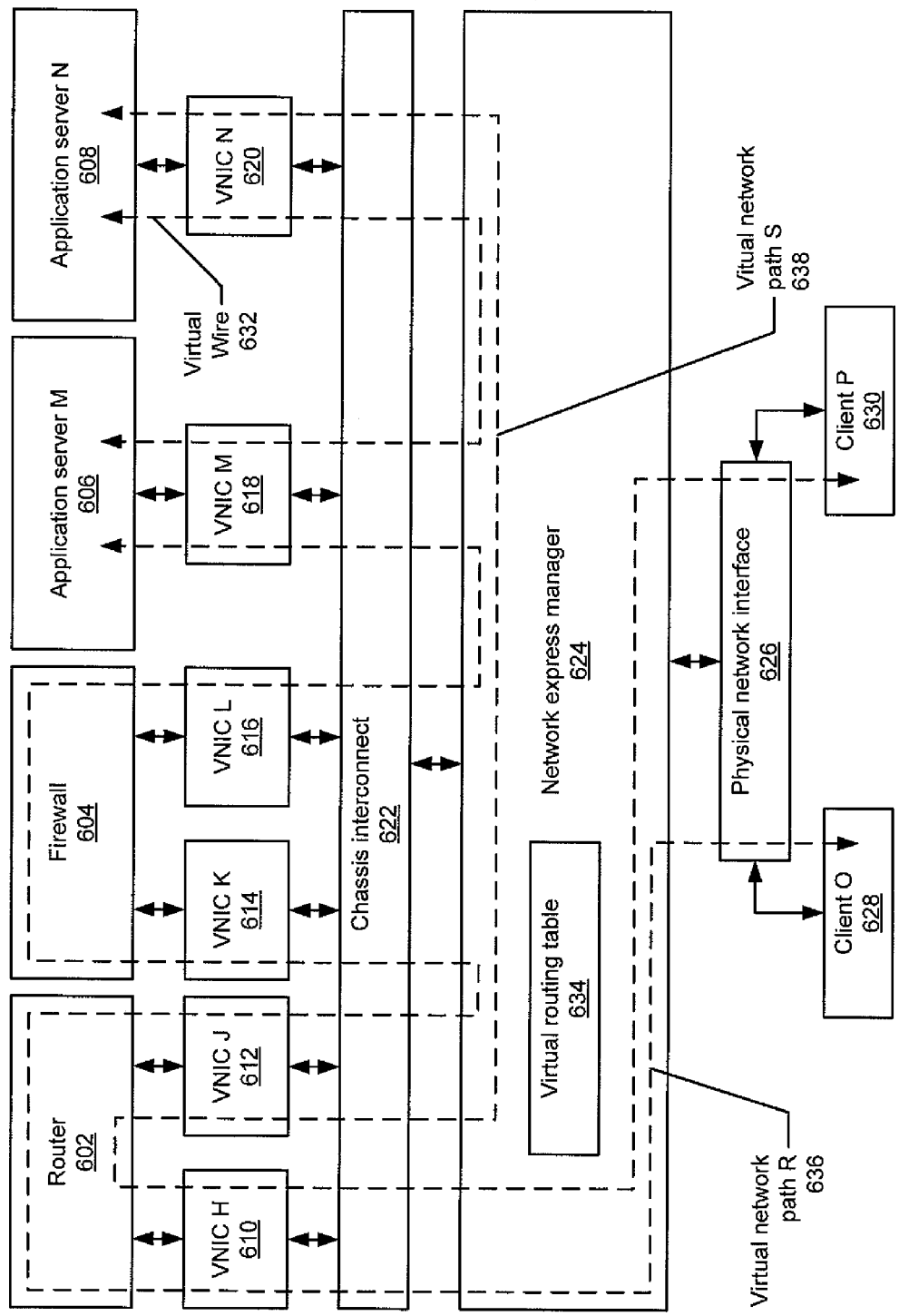
Figure 6C:
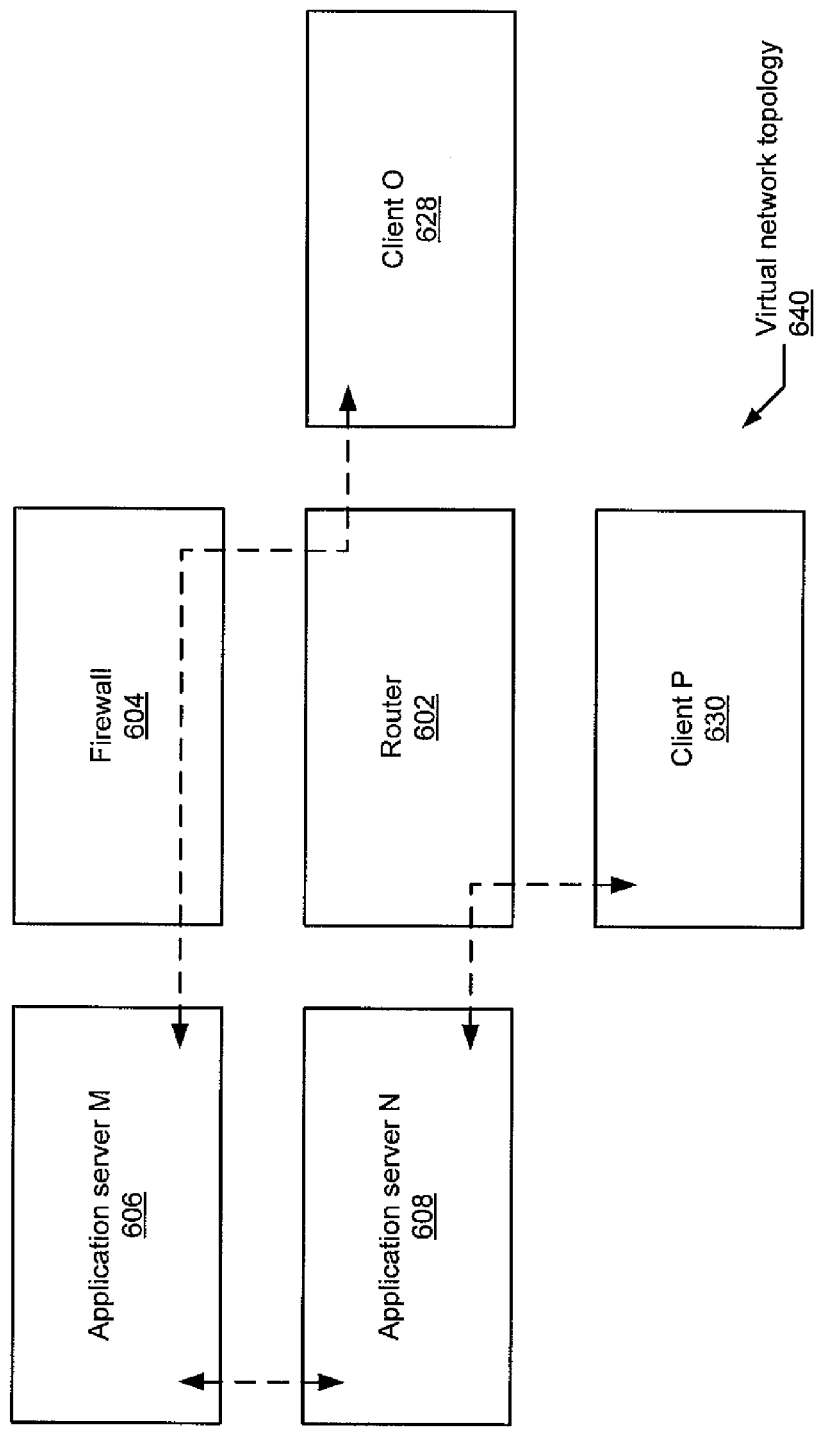

FIGS. 6A-6C show an example of creating virtual network paths in accordance with one or more embodiments of the invention. Specifically, FIG. 6A shows a diagram of an actual topology (600) in accordance with one or more embodiments of the invention, FIG. 6B shows how network traffic may be routed through the actual topology (600), and FIG. 6C shows a virtual network topology (640) created by switching network traffic as shown in FIG. 6B. FIGS. 6A-6C are provided as examples only, and should not be construed as limiting the scope of the invention.

Referring first to FIG. 6A, the actual topology (600) includes multiple virtual machines. Specifically, the actual topology (600) includes a router (602), a firewall (604), application server M (606), and application server N (608), each executing in a separate virtual machine. The virtual machines are located in blades communicatively coupled with a chassis interconnect (622), and include networking functionality provided by the blades via VNICs (i.e., VNIC H (610), VNIC J (612), VNIC K (614), VNIC M (618), and VNIC N (620)). For ease of illustration, the blades themselves are not included in the diagram.

In one or more embodiments of the invention, the router (602), the firewall (604), application server M (606), and application server N (608) are each located in separate blades. Alternatively, as noted above, a blade may include multiple virtual machines. For example, the router (602) and the firewall (604) may be located in a single blade. Further, each virtual machine may be associated with a different number of VNICs than the number of VNICs shown in FIG. 6A.

Continuing with discussion of FIG. 6A, a network express manager (624) is configured to manage network traffic flowing to and from the virtual machines. Further, the network express manager (624) is configured to manage access to a physical network interface (626) used to communicate with client O (628) and client P (630). In FIG. 6A, the virtual machines, VNICs, chassis interconnect (622), network express manager (624), and physical network interface (626) are all located within a chassis interconnect. Client O (628) and client P (630) are located in one or more networks (not shown) to which the chassis interconnect is connected.

FIG. 6B shows how network traffic may be routed through the actual topology (600) in accordance with one or more embodiments of the invention. In one or more embodiments of the invention, the switching is performed by the network express manager (624) using a virtual switching table (634).

As discussed above, network traffic routed to and from the VNICs may be though of as flowing through a "virtual wire." For example, FIG. 6B shows a virtual wire (632) located between application server M (606) and application server N (608). To use the virtual wire, application server M (606) transmits a network packet via VNIC M (618). The network packet is addressed to VNIC N (620) associated with application server N (608). The network express manager (624) receives the network packet via the chassis interconnect (622), inspects the network packet, and determines the target VNIC location using the virtual switching table (634). If the target VNIC location is not found in the virtual switching table (634), then the network packet may be dropped. In this example, the target VNIC location is the blade in which VNIC N (620) is located. The network express manager (624) routes the network packet to the target VNIC location, and application server N (608) receives the network packet via VNIC N (620), thereby completing the virtual wire (632). In one or more embodiments of the invention, the virtual wire (632) may also be used to transmit network traffic in the opposite direction, i.e., from application server N (608) to application server M (606).

Further, as discussed above, multiple virtual wires may be combined to form a "virtual network path." For example, FIG. 6B shows virtual network path R (636), which flows from client O (628), through the router (602), through the firewall (604), and terminates at application server M (606). Specifically, the virtual network path R (636) includes the following virtual wires. A virtual wire is located between the physical network interface (626) and VNIC H (610). Another virtual wire is located between VNIC J (612) and VNIC K (614). Yet another virtual wire is located between VNIC L (616) and VNIC M (618). If the router (602) and the firewall (604) are located in the same blade, then a virtual switch may be substituted for the virtual wire located between VNIC J (612) and VNIC K (614), thereby eliminating use of the chassis interconnect (622) from communications between the router (602) and the firewall (604).

Similarly, FIG. 6B shows virtual network path S (638), which flows from client P (630), through the router (602), and terminates at application server N (608). Virtual network path S (638) includes a virtual wire between the physical network interface (626) and VNIC H (610), and a virtual wire between VNIC J (612) and VNIC N (620). The differences between virtual network path R (636) and virtual network path S (638) exemplify how multiple virtual network paths may be located in the same blade chassis.

In one or more embodiments of the invention, VNIC settings are applied separately for each virtual network path. For example, different bandwidth limits may be used for virtual network path R (636) and virtual network path S (638). Thus, the virtual network paths may be thought of as including many of the same features as traditional network paths (e.g., using Ethernet cables), even though traditional network wires are not used within the blade chassis. However, traditional network wires may still be required outside the blade chassis, for example between the physical network interface (626) and client O (628) and/or client P (630).

FIG. 6C shows a diagram of the virtual network topology (640) resulting from the use of the virtual network path R (636), virtual network path S (638), and virtual wire (632) shown in FIG. 6B. The virtual network topology (640) allows the various components of the network (i.e., router (602), firewall (604), application server M (606), application server N (608), client O (628), and client P (630)) to interact in a manner similar to a traditional wired network. However, as discussed above, communication between the components located within the blade chassis (i.e., router (602), firewall (604), application server M (606), and application server N (608)) is accomplished without the use of traditional network wires.

Embodiments of the invention allow for virtual network paths to be created using virtual wires, without the need for traditional network wires. Specifically, by placing virtual machines in blades coupled via a chassis interconnect, and switching network traffic using VNICs and a virtual switching table, the need for traditional network wires between the virtual machines is avoided. Thus, embodiments of the invention facilitate the creation and reconfiguration of virtual network topologies without the physical labor typically involved in creating a traditional wired network.

In one embodiment of the invention, the system described above may be used to offload network processing. More specifically, network processing from one blade may be offloaded to another blade in the chassis. In one embodiment of the invention, network processing corresponds to any processing required to satisfy a networking protocol. Examples of networking protocols include, but are not limited to, Transmission Control Protocol (TCP), Internet Protocol (IP), User Datagram Protocol (UDP), Internet Protocol (IP), and Internet Protocol Security (IPSec). Examples of network processing include, but are not limited to, encryption, decryption, authentication, IP fragment reconstruction, large segment offload processing, and data integrity checking.

Figure 7:
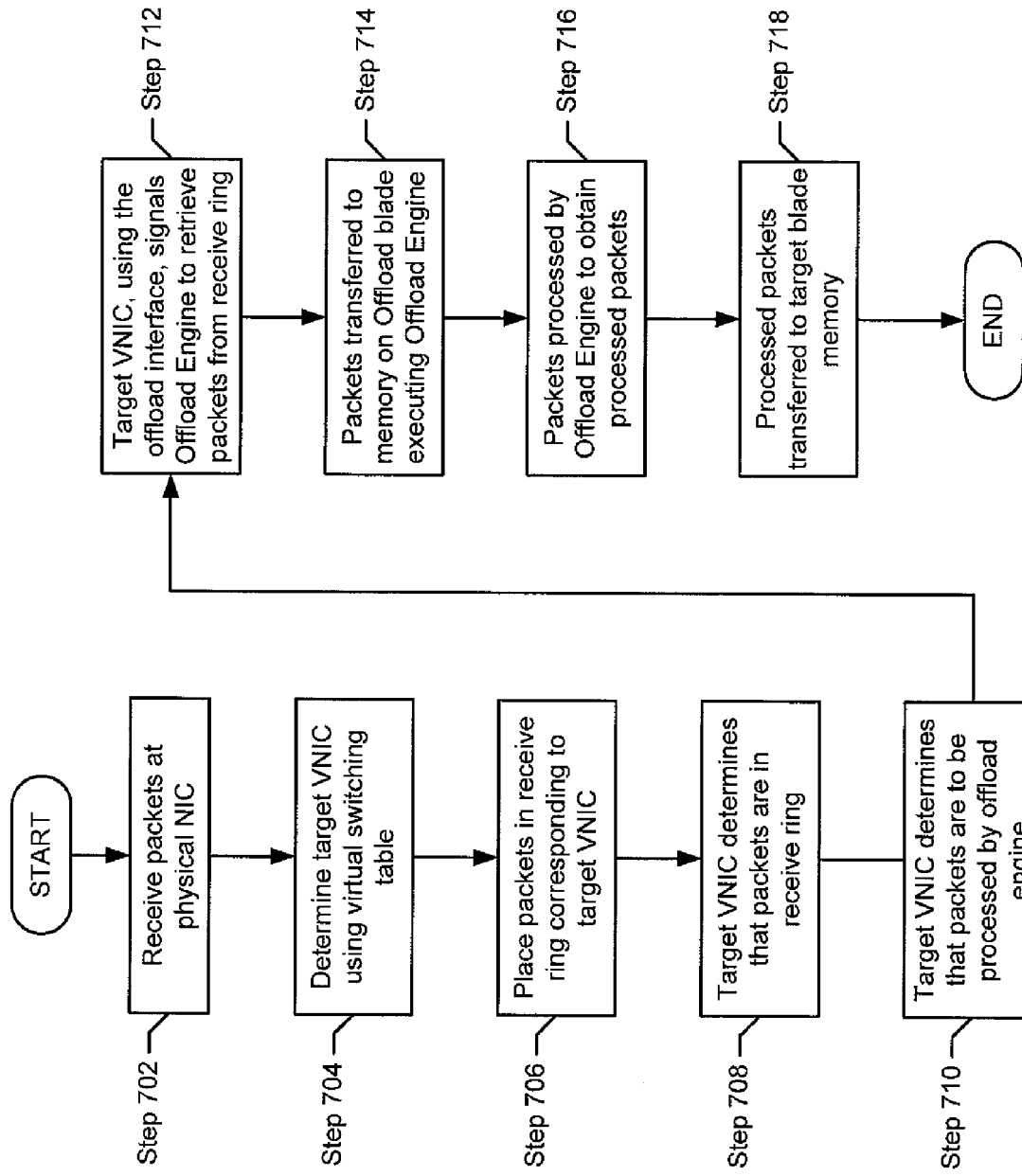
FIG. 7 shows a flowchart in accordance with one or more embodiments of the invention.
Figure 8:
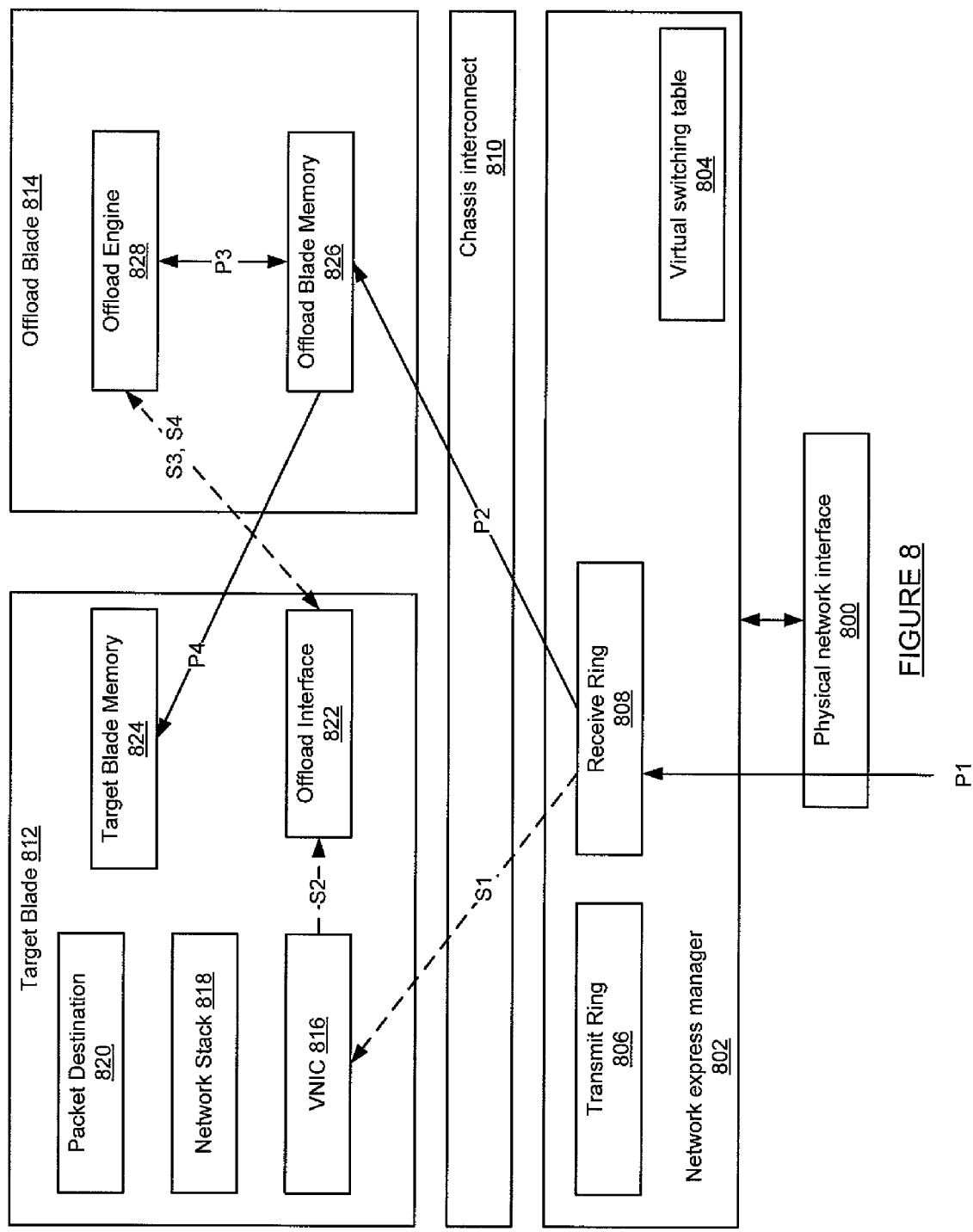
FIG. 8 shows an example in accordance with one or more embodiments of the invention.
Figure 9:
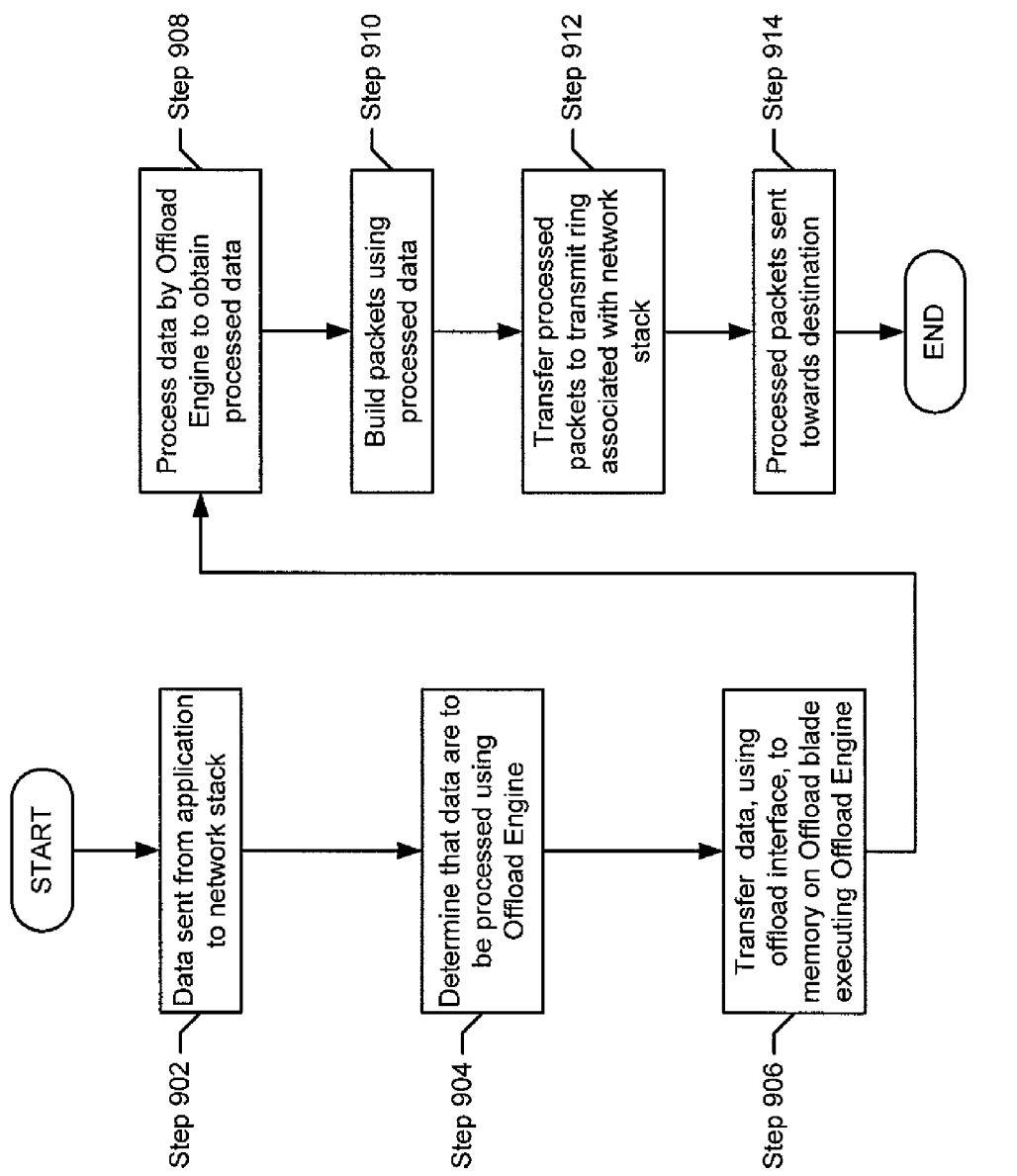
FIG. 9 shows a flowchart in accordance with one or more embodiments of the invention.
Figure 10:
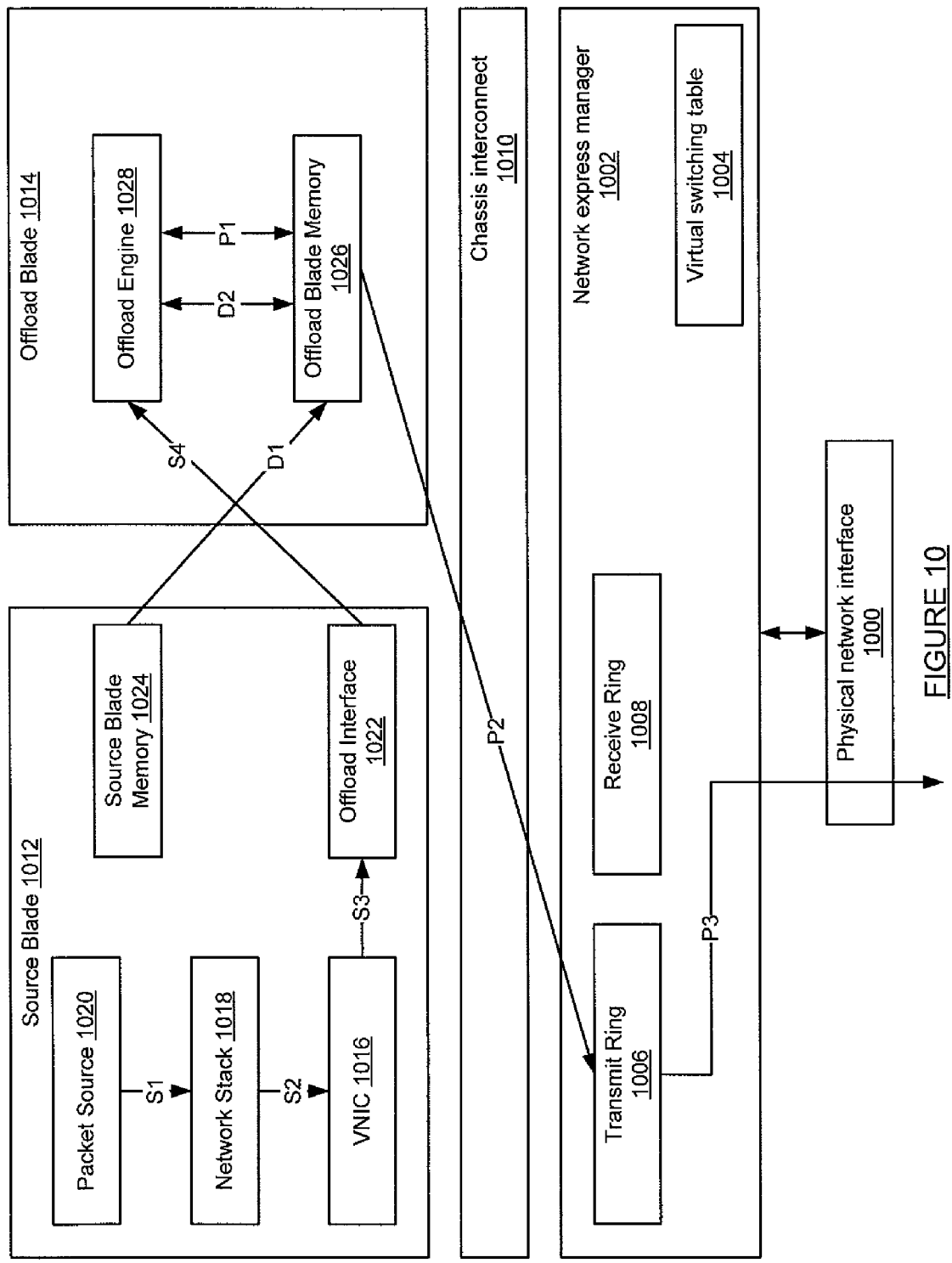
FIG. 10 shows an example in accordance with one or more embodiments of the invention.

FIGS. 7 and 8 describe a flowchart and an example, respectively, for processing of inbound network traffic received by a VNIC (i.e., traffic received from a source external to the blade on which the VNIC is located). FIGS. 9 and 10 describe a flowchart and an example, respectively, for processing outbound network traffic received by the VNIC (i.e., traffic received from a source internal to the blade on which the VNIC is located).

Referring to FIG. 7, FIG. 7 shows a flowchart in accordance with one or more embodiments of the invention. More specifically, FIG. 7 describes a method for offloading the processing of packets destined for a target blade using an offload engine located in an offload blade.

In one or more embodiments of the invention, one or more of the steps shown in FIG. 7 may be omitted, repeated, and/or performed in a different order. Accordingly, embodiments of the invention should not be considered limited to the specific arrangement of steps shown in FIG. 7.

In Step 702, packets are received by the physical network interface (110 in FIG. 1). In Step 704, a target VNIC (i.e., the VNIC for which the packets are destined) is selected using the destination addresses (e.g., IP addresses) in the packets. In embodiment of the invention, a virtual switching table (302 in FIG. 3) in the network express manager (108 in FIG. 1) is used to determine the target VNIC associated with the destination address. In Step 706, the packets are placed in the receive ring corresponding to the target VNIC. In one embodiment of the invention, the receive ring corresponds to a buffer (or set of buffers) in the network express manager. In one embodiment of the invention, the network express manager may include multiple receive rings, where each receive ring is associated with a different VNIC.

In Step 708, the target VNIC determines that there are packets in the receive ring. In one embodiment of the invention, an interrupt is issued to the target blade (i.e., the blade hosting the target VNIC) after the packets are placed in the receive ring. In such cases, the receipt of the signals by the target VNIC enable the target VNIC to determine that there are packets in the receive ring. In another embodiment of the invention, the target VNIC (or a related process) periodically polls the network express manager to determine whether there are packets in the receive ring (i.e., the receive ring with which it is associated). If packets are present in the receive ring, the network express manager (in response to the polling) issues a response to the target VNIC (or the related process), which reflects the presence of the packets in the receive ring.

In Step 710, the target VNIC (or a related process) determines that the packets are to be processed by an offload engine. In one embodiment of the invention, the target VNIC (or a related process) may make this determination on a per-packet basis. In such cases, the target VNIC (or a related process) obtains information about the packet (e.g., information in the packet header) to determine whether to offload the network processing of the packet. In one embodiment of the invention, the target VNIC (prior to receiving the packets) is configured to offload all network processing to the offload engine. In such cases, once the target VNIC makes the determination in Step 708 that packets are present in the receive ring, the target VNIC can proceed directly to Step 712.

In Step 712, upon making the determination in Steps 708 or 710, the target VNIC signals (using any known mechanism) an offload engine executing on the offload blade that the packets present in the receive ring are to be processed by the offload engine. In one embodiment of the invention, the target VNIC communicates with the offload engine using an offload interface located on the target blade. In one embodiment of the invention, the offload interface is located in the Media Access Control (MAC) layer of the target blade.

In Step 714, packets are transferred from the receive ring to the offload memory (i.e., memory in the offload blade). In one embodiment of the invention, the packets are transferred using the chassis interconnect (106 in FIG. 1). In one embodiment of the invention, the network express manager include a direct memory access (DMA) engine, where the DMA engine is configured to transfer the packets from the receive ring to the offload blade memory.

In Step 716, the packets are processed by the offload engine. In one embodiment of the invention, the offload engine (prior to Step 714) includes the necessary information (e.g., decryption keys) to process the packets. Alternatively, if the offload engine does not include the necessary information, the offload engine requests this information from the target blade. In Step 718, the processed packets are transferred from the offload memory to the target blade memory over the chassis interconnect. Once the processed packets are received by the target blade, the target blade may take the necessary actions to provide the packets to the appropriate destination within the target blade. In one embodiment of the invention, the processed packets may be transferred to the target blade using the method described in commonly-owned U.S. patent application entitled "Method and System for Media-Based Data Transfer" with U.S. application Ser. No. 12/040,105, which is hereby incorporated by reference.

In one embodiment of the invention, the chassis may include one or more offload blades (i.e., blades with software configured to perform the network processing). In such cases, the method described in FIG. 7 may be extended to include the selection of the appropriate offload engine to process the packets. The selection of the offload engine may be based on, but not limited to, one or more of the following factors: (i) availability of the offload engine, (ii) presence of the necessary information to perform the offloading (e.g., are the necessary encryption keys present in the offload engine), and (iii) hardware platform on which the offload engine is executing (e.g., number of processors, size of memory, etc.).

FIG. 8 shows an example in accordance with one or more embodiments of the invention. The example in FIG. 8 is not intended to limit the scope of the invention. Turning to the example, initially packets (P1) are received by the physical network interface (800). The packets (P1) are sent to the network express manager (802), which uses the virtual routing table (804) and the destination address in the packets (in this example the destination address corresponds to the IP address associated with the VNIC (816)) to place the packets in the corresponding receive ring (808). The VNIC (816) is also associated with a transmit ring (806), which is used to send outbound network traffic from the VNIC (816) to the physical network interface (800).

Continuing with the example, an interrupt (S1) is issued to the VNIC (816) once the packets are placed in the receive ring (816). The VNIC (816), which has been pre-configured to offload all network processing, subsequently sends a signal (S2) to the offload interface (822) indicating that the receive ring includes packets that require networking processing. The offload interface (822) in turn sends a signal (S3) to the offload engine (828) executing on the offload blade (814).

The offload engine (828) (or a related process) transfers the packets from the receive ring (808) to the offload blade memory (826). The offload engine (828) subsequently processes the packets to generate processed packets. The offload engine (828) informs the target blade (812), via the offload interface (822), that the packets have been processed (S4). The target blade (824) subsequently transfers the processed packets from the offload blade memory (826) to the target blade memory (824). At this point, the various components in the target blade (812) (e.g., the VNIC (816), the network stack (818)) perform the steps necessary for the processed packets to reach the packet destination (820). In one embodiment of the invention, the packet destination (820) corresponds to one of a virtual execution environment executing in the target blade, a virtual machine executing in the target blade, and an application executing in the target blade.

Those skilled in the art will appreciate that, while not explicitly shown, all communication between the network express manager (and component executing thereon) and the target blade (and components executing thereon) is communicated over the chassis interconnect (810). Further, while not explicitly shown, all communication between the network express manager (and component executing thereon) and the offload blade (and components executing thereon) is communicated over the chassis interconnect (810). Finally, while not explicitly shown, all communication between the offload blade (and component executing thereon) and the target blade (and components executing thereon) is communicated over the chassis interconnect (810).

Those skilled in the art will also appreciate that signals S1-S4 be communicated using any known communication mechanism capable of communicating the information described above with respect to signals S1-S4.

FIG. 9 shows a flowchart in accordance with one or more embodiments of the invention. More specifically, FIG. 9 describes a method for offloading the network processing of data sent from a source blade using an offload engine located in an offload blade.

In one or more embodiments of the invention, one or more of the steps shown in FIG. 9 may be omitted, repeated, and/or performed in a different order. Accordingly, embodiments of the invention should not be considered limited to the specific arrangement of steps shown in FIG. 9.

In Step 902, data is sent from a packet source to a corresponding network stack. In one embodiment of the invention, the packet source corresponds to one of a virtual execution environment executing in the target blade, a virtual machine executing in the target blade, and an application executing in the target blade. In Step 904, the network stack (or a related process) determines that the data is to be processed by an offload engine. Said another way, the offload engine is to be used to process the data to generate packets, which may be sent over the network to a destination specified by the packet source. In one embodiment of the invention, the determination in Step 902 may be performed on a per-packet basis based on, for example, the intended destination of the data. Alternatively, the network stack may be pre-configured to offload all data received from the packet source.

In Step 906, once the determination in Step 904 is made, the data is transferred to the offload engine using the offload interface. In one embodiment of the invention, transferring the data includes: (i) sending the data to the VNIC associated with the network stack, (ii) signaling the offload engine, via the offload interface, that the VNIC includes data to send to the offload engine, (iii) transferring, by the offload engine (or a related process), the data to the offload blade memory.

In Step 908, the data is processed by the offload engine to obtain processed data. In Step 910, the processed data is used to generate packets. In Step 912, the packets are transferred to the transmit ring in the network express manager associated with a VNIC in the source blade, where the VNIC is associated with the network stack. In Step 914, the packets are subsequently sent to towards their destination.

Those skilled in the art will appreciate that instead of transferring data between the various components within the source blade, the data remains in the source blade memory and pointers (as well as other associated information) to the data are transferred between the various components in the source blade.

FIG. 10 shows an example in accordance with one or more embodiments of the invention. The example in FIG. 10 is not intended to limit the scope of the invention. Turning to the example, the data to be sent are initially stored in the source blade memory (1024). The packet source (1020) initiates the sending of data to a destination external to the physical network interface (1000) by sending a signal (S1) to the network stack (1018). The network stack (1018) includes functionality to perform network processing; however, in this example the network stack (1018) determines that the network processing is to be offloaded. Accordingly, the network stack (1018) sends an appropriate signal (S2) to the VNIC (1016) (e.g., the signal (S2) may include a flag indicating that the data is to be offloaded for network processing). The VNIC (1016), in turn, sends a signal (S3) to the offload interface (1022), which is subsequently communicated to the offload engine (1028) on the offload blade (1014).

The offload engine (1028) upon receipt of the signal (S4) from the offload interface (1022) initiates the transfer of the data (D1) from the source blade memory (1024) to the offload blade memory (1026). The offload engine (1028) then processes the data to obtain processed data (D2), which is used to build the packets (P1). The packets are then transferred (P2) to the transmit ring (1006) associated with the VNIC (1016), where the transmit ring is located on the network express manager (1002). The VNIC (1016) is also associated with a receive ring (1008). The packets are subsequently transmitted towards their destination using, in part, the virtual routing table (1004).

Those skilled in the art will appreciate that, while not explicitly shown, all communication between the network express manager (and component executing thereon) and the source blade (1012) (and components executing thereon) is communicated over the chassis interconnect (1010). Further, while not explicitly shown, all communication between the network express manager (and component executing thereon) and the offload blade (1014) (and components executing thereon) is communicated over the chassis interconnect (1010). Finally, while not explicitly shown, all communication between the offload blade (and component executing thereon) and the source blade (and components executing thereon) is communicated over the chassis interconnect (1010).

Those skilled in the art will also appreciate that signals S1-S4 may be communicated using any known communication mechanism capable of communicating the information described above with respect to signals S1-S4. Further, those skilled in the art will appreciate that the signals S1-S4 may include pointers (as well as other associated information) to the data (i.e., the data to be converted into packets) as opposed to including the data itself.

Those skilled in the art will appreciate that while the invention has been described with respect to using blades, the invention may be extended for use with other computer systems, which are not blades. Specifically, the invention may be extended to any computer, which includes at least memory, a processor, and a mechanism to physically connect to and communicate over the chassis bus. Examples of such computers include, but are not limited to, multi-processor servers, network appliances, and light-weight computing devices (e.g., computers that only include memory, a processor, a mechanism to physically connect to and communicate over the chassis bus), and the necessary hardware to enable the aforementioned components to interact.

Further, those skilled in the art will appreciate that if one or more computers, which are not blades, are not used to implement the invention, then an appropriate chassis may be used in place of the blade chassis.

Further, those skilled in the art will appreciate that while the invention has been described with respect an offload computer or offload blade, the offload processing may be performed using any hardware capable of connecting to the chassis interconnect and including the functionality of the offload blade discussed above.

Software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing a packet, comprising:
    receiving the packet by a physical network interface, wherein the packet comprises a destination address;
    determining a target virtual network interface card (VNIC) using the destination address and a virtual switching table (VST), wherein the VST is located on a network express manager (NEM) and the target VNIC is located on a target computer operatively connected to the NEM via a chassis interconnect;
    transferring the packet to a receive ring (RR) associated with the target VNIC, wherein the RR is located on the NEM;
    determining, by the target VNIC, that the packet is in the RR;
    determining, by the target VNIC, that the packet is to be processed using an offload engine;
    transferring the packet to offload memory located on an offload computer, wherein the offload computer is operatively connected to the NEM via the chassis interconnect and wherein the offload engine is executing on the offload computer;
    processing the packet by the offload engine to obtain a processed packet; and
    transferring the processed packet to a target computer memory using the chassis interconnect,
    wherein the chassis interconnect comprises a Peripheral Component Interface Express (PCI-E) backplane, and wherein the VST comprises a mapping of the target VNIC to a PCI-E endpoint on the PCI-E backplane.

2. The method of claim 1, wherein processing the packet comprises at least one selected from a group consisting of decrypting at least a portion of the packet and authenticating the packet.

3. The method of claim 1, wherein processing the packet comprises processing the packet in accordance a Transmission Control Protocol (TCP).

4. The method of claim 1, wherein determining that the packet is in the RR comprises receiving an interrupt by the target computer from the NEM.

5. The method of claim 1, wherein determining that the packet is in the RR comprises polling the RR by the target computer to determine whether packets are present in the RR.

6. The method of claim 1, wherein the target computer and the offload computer are blades.

7. A system comprising:
    a computer comprising memory, a virtual network interface (VNIC), a network stack associated with the VNIC, and a packet destination associated with the network stack;
    an offload computer comprising an offload engine and offload memory;
    a chassis interconnect configured to communicatively couple the computer and the offload computer, wherein the chassis interconnect comprises a Peripheral Component Interface Express (PCI-E) backplane;
    a network express manager (NEM) communicatively coupled to the chassis interconnect and comprising a physical network interface, a virtual switching table (VST), and a receive ring (RR) associated with the VNIC, wherein the VST comprises a mapping of the VNIC to a PCI-E endpoint on the PCI-E backplane;
wherein the NEM is configured to:
   receive a packet, using the physical network interface, wherein the packet comprises a destination address,
   transfer the packet to the RR using the VST and the destination address;
wherein the computer is configured to:
   determine that the packet is in the RR,
   determine that the packet is to be processed using the offload engine, and
   initiate transfer of the packet to the offload memory,
wherein the NEM is further configured to:
   transfer the packet from the RR to the offload memory;
wherein the offload engine is configured to:
   process the packet to obtain a processed packet, and
   initiate transfer of the processed packet to the computer; and wherein the computer is further configured to:
   receive the processed packet from the offload engine.

8. The system of claim 7, wherein processing the packet comprises at least one selected from a group consisting of decrypting at least a portion of the packet and authenticating the packet.

9. The system of claim 7, wherein processing the packet comprises processing the packet in accordance a Transmission Control Protocol (TCP).

10. The system of claim 7, wherein determining that the packet is in the RR comprises performing at least one selected from a group consisting of polling the RR by the computer to determine whether packets are present in the RR and receiving an interrupt by the target computer from the NEM.

11. The system of claim 7, wherein the target computer and the offload computer are blades.

* * * * *